W. J. HERSCHEDE AND W. EBERHARDT.
FEED MECHANISM FOR GRINDING MACHINES.
APPLICATION FILED JULY 26, 1920.
1,401,699. Patented Dec. 27, 1921.
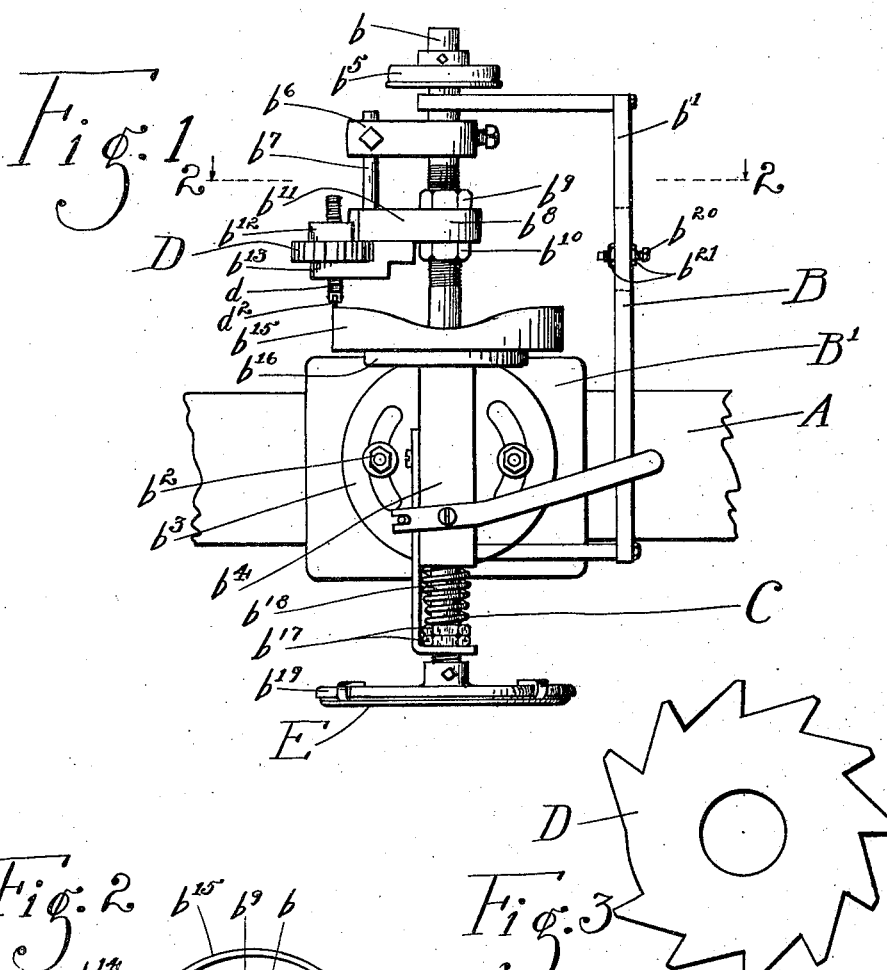
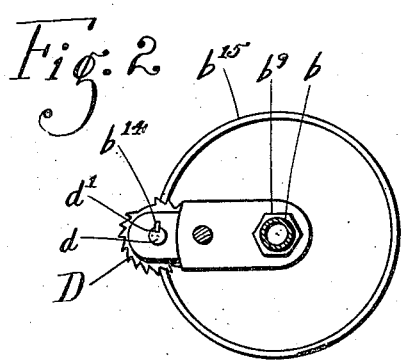
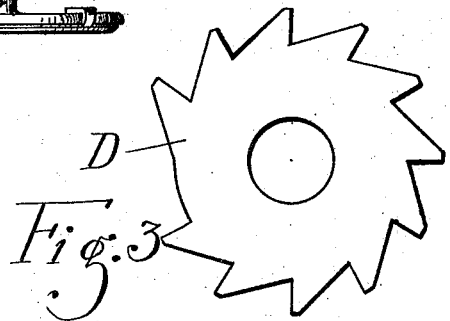
Inventors
Walter J. Herschede
Walter Eberhardt
By Walter F. Murray
Attorney

UNITED STATES PATENT OFFICE.

WALTER J. HERSCHEDE AND WALTER EBERHARDT, OF CINCINNATI, OHIO.

FEED MECHANISM FOR GRINDING-MACHINES.

1,401,699.  Specification of Letters Patent.  Patented Dec. 27, 1921.

Application filed July 26, 1920. Serial No. 398,994.

*To all whom it may concern:*

Be it known that we, WALTER J. HERSCHEDE and WALTER EBERHARDT, citizens of the United States of America, and residents of Cincinnati, in the county of Hamilton and State of Ohio, have invented a new and useful Improvement in a Feed Mechanism for Grinding-Machines, of which the following is a specification.

Our invention is especially adaptable to glass grinding machines, but may be used upon other devices. We will explain our invention as applied to machines that are used to grind glass plates, such machines having a revoluble grindstone that is engaged by glass plates supported upon a revoluble feed shaft adapted to hold the glass plate upon the grindstone and to reciprocate the glass plate across the face of the grindstone.

An object of our invention is to provide a positive feed mechanism for grinding devices of the kind referred to.

Another object is to provide a device that will automatically feed a glass plate upon a grindstone until a desired finish has been made and will then check the feed.

These and other objects are attained by the means described herein and disclosed in the accompanying drawing in which:

Figure 1 is a side elevation of a device embodying our invention and mounted upon a support bar that is disposed adjacent to a grindstone.

Fig. 2 is a sectional view on line 2—2 of Fig. 1.

Fig. 3 is an enlarged plan view of a feed wheel forming a detail of our invention.

Fig. 4 is an elevation of the feed wheel shown in Fig. 3.

The support bar A is mounted adjacent to a grindstone, not shown, and has the plate carriage B slidably mounted upon it. The spring C assures a positive contact of the glass on the plate holder $b^{19}$ upon the grindstone. The mutilated gear D is adapted to advance the plate holder toward the grindstone and is so constructed that it will advance the plate holder or chuck $b^{19}$ to a determinable distance, after which the gear is inoperative as an advancing means.

The support bar A may be of any type or kind upon which the slide B', upon which the revoluble disk $b^3$ having the carriage B mounted thereon, may be reciprocated.

The plate carriage comprises a frame $b'$ supporting the longitudinally reciprocating shaft $b$, extending through the sleeve $b^4$ mounted upon the disk $b^3$ secured to the slide B' by the bolts $b^2$. The shaft $b$ is revolved by means of a driving pulley $b^5$ mounted on the shaft. Mounted on the shaft $b$ is a block $b^6$ having a pin $b^7$ extending therefrom, parallel with shaft $b$ and engaging the collar $b^8$ mounted on the shaft and retained thereupon by means of the adjustable nuts $b^9$ and $b^{10}$ mounted upon a threaded part of the shaft $b$. The collar $b^8$ has an outwardly extending arm $b''$ upon which are mounted the perforated lugs $b^{12}$ and $b^{13}$ between which is mounted a mutilated gear D, threaded upon the screw $d$ extending through the perforations in the lugs $b^{12}$ and $b^{13}$, and having a longitudinal slot $d'$ in which the key $b^{14}$ secured to the lugs engages, thereby permitting longitudinal reciprocation of the screw in parallelism with the shaft $b$. A roller $d^2$ is revolubly mounted on the screw at the bottom thereof, and is adapted to engage the pattern device $b^{15}$ mounted upon the flange $b$ upon the sleeve $b^4$. Mounted on the shaft $b$ adjoiningly to and engaging the sleeve is the spring C. The spring also contacts the lock nuts $b^{17}$ on the shaft, normally pushing the lock nuts from the sleeve and thereby holding the roller $d^2$ in engagement with the pattern $b^{15}$. The lifting arm $b^{18}$ is adapted to engage the lock nuts and move them toward the spring C, thereby disengaging the roller and the pattern, and withdrawing the plate of glass E mounted on the plate holder $b^{19}$ from the grindstone. Mounted on the frame $b'$ and in radial alinement with and extending partly into the path of the gear D about the shaft $b$ is an adjustable lug $b^{20}$ adapted to engage one of the teeth of the gear D as the gear moves by such lug, thereby moving the screw $d$ longitudinally. Lock nuts $b^{21}$ secure the lug $b^{20}$ in an adjusted position. The number of threads per inch and the pitch of the threads upon the screw $d$ and the gear D together with the number of teeth on the gear determine the rate at which the glass plate is fed upon the grindstone, and will vary according to the work.

The operation of our device is as follows:

The glass plate is set so that it engages the grindstone. The pitch and number of the threads on the screw $d$ and gear D are known quantities, therefore the operator will set the gear wheel in such position that as it is moved past the lug $b^{20}$, enough of the teeth on the gear will successively engage the lug $b^{20}$ that the screw $d$ will be moved upward through the gear and perforated lugs $b^{12}$ and $b^{13}$ to a distance equal to the extent of the grinding to be done on the plate, by the time that the mutilated section of the gear will be moved to that place at which the teeth on the gear engage the lug $b^{20}$. The collar $b^8$ is then secured upon the shaft by the adjustment nuts $b^9$ and $b^{10}$. When the shaft $b$ is revolved and the plate E engages the grindstone, the spring C pushes the plate holder from the sleeve, thereby holding the plate E in positive contact with the grindstone. The roller $d^2$ engages the pattern $b^{15}$ and limits the extent to which the shaft $b$ can be moved toward the grindstone. As the gear D passes the lug $b^{20}$, the lug engages one of the teeth on the gears and turns the gear, thereby moving the screw $d$ longitudinally upward in relation to the gear, permitting the shaft $b$ to be moved toward the grindstone to a distance equal to the longitudinal movement of screw $d$. The spring C causes the shaft $b$ to move toward the grindstone and hold the plate in engagement with the grindstone. When the mutilated part of the gear registers with the lug $b^{20}$, the gear and lug will pass without engaging one another, the plate will not be ground further although it may still be revolved adjacent to the stone.

What we claim is:

1. In a feed mechanism for grinding machines the combination of a reciprocable work-carrying shaft, a stop mechanism for limiting the feed of the shaft and automatic means for varying the positions of the stop mechanism.

2. In a feed mechanism for grinding machines, the combination of a reciprocable work-carrying shaft, a stop mechanism for limiting the feed of the shaft and an adjustable automatic means for varying the positions of the stop mechanism.

3. In a feed mechanism for grinding machines the combination of a reciprocable work-carrying shaft, a stop mechanism for limiting the feed of the shaft and comprising a pattern, a pin mounted movably upon the shaft and contacting with the pattern and automatic means for actuating the pin.

4. A feed mechanism comprising a longitudinally movable shaft, means to rotate the shaft, means to yieldingly move the shaft longitudinally, a pattern device, means to limit the yieldable moving means and comprising a collar mounted on the shaft, a longitudinally movable screw mounted on the collar and having on one of its ends a roller engaging the patern device, a mutilated gear on the screw, and means adapted to be extended into the path of the gear and to successively engage one of the teeth of the gear and to permit the mutilated part of the gear to pass by without engaging the gear.

In witness whereof, we have hereunto subscribed our names this 21st day of July, 1920.

WALTER J. HERSCHEDE.
WALTER EBERHARDT.